No. 868,775.   PATENTED OCT. 22, 1907.
R. F. GREEN.
WEATHER STRIP FOR DOORS.
APPLICATION FILED DEC. 29, 1906.
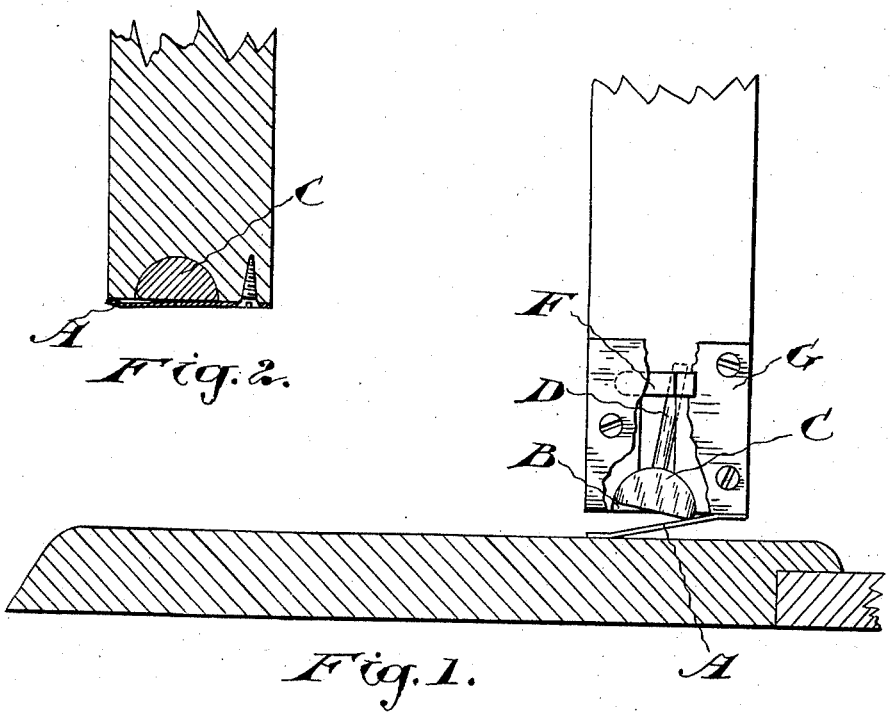
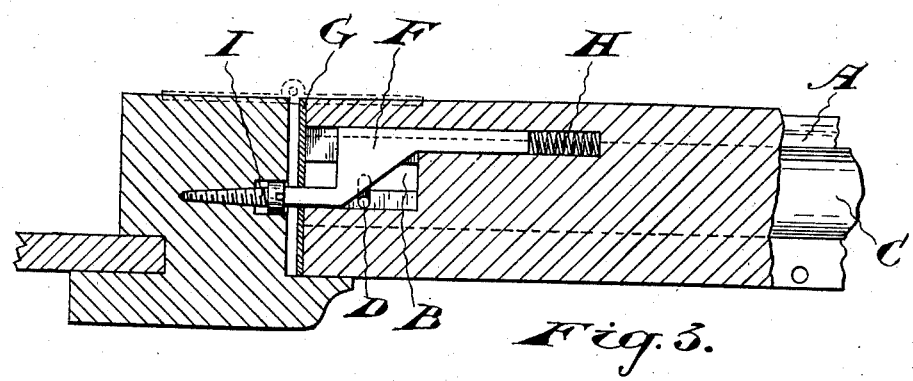
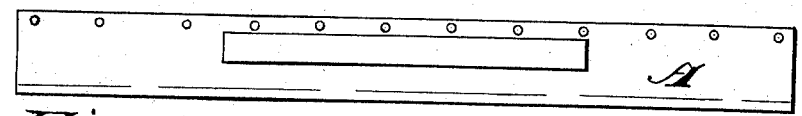
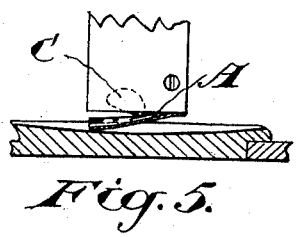
WITNESSES:
INVENTOR.
Robert F. Green
BY Ridout & Maybee
ATTORNEYS.

UNITED STATES PATENT OFFICE.

ROBERT F. GREEN, OF TORONTO, ONTARIO, CANADA.

WEATHER-STRIP FOR DOORS.

No. 868,775.  Specification of Letters Patent.  Patented Oct. 22, 1907.

Application filed December 29, 1906. Serial No. 349,970.

*To all whom it may concern:*

Be it known that I, ROBERT F. GREEN, of the city of Toronto, in the Province of Ontario, Canada, have invented certain new and useful Improvements in Weather-Strips for Doors and the Like, of which the following is a specification.

My object is to devise a weather strip particularly adapted for the bottom of doors, and my invention consists essentially of a spring metal strip secured by one edge along the bottom of the door, and means operated by the action of closing the door for springing down the metal strip into contact with the threshold of the door, substantially as hereinafter more specifically described, and then definitely claimed.

Figure 1 is a vertical sectional elevation of part of a door and its threshold showing my improved weather strip. Fig. 2 is a vertical section of part of the bottom of the door showing the weather strip in the position it assumes when the door is open. Fig. 3 is a sectional plan showing the weather strip. Fig. 4 is a plan view of the strip proper with a reinforcing strip applied thereto. Fig. 5 is a vertical section showing the effect of the reinforcing strip.

In the drawings like letters of reference indicate corresponding parts in the different figures.

A is a strip of spring sheet metal, preferably brass, which is secured by one edge to the bottom of the door. In the bottom of the door, above this strip, is formed a longitudinal groove B, semi-circular in cross section. In this groove lies a bar C of the same shape and size in cross section as the groove. It is evident that by rocking this bar the strip A will be sprung downwardly (see Fig. 1). As the edge of the bar engages the strip between its fixed and free edges the free edge of the strip possesses a sufficient amount of resiliency to hold it in close engagement with the threshold when the door is closed.

While I specify the groove and bar as being half round, it is, however, evident that any shape which would produce a similar cam like action by the rocking of the bar would answer the purpose of my invention.

While numerous devices might be devised for the purpose of rocking the bar C as the door is closed, I illustrate a specific construction which best answers the purpose. Near the hinge side of the door the bar C is provided with an upwardly extending arm D, working in a recess in the door.

Sliding in a recess in the door is a wedge bar F, so proportioned and located that as the door is closed the end of the bar which projects through the edge of the door will engage the door jamb and thus cause the wedge to move the arm D to cause the bar C to spring down the strip A.

The edge of the door is provided with a plate G having a hole therein for the passage of the end of the bar F. Between the other end of the bar F and the recess in which it slides is a coil spring H, which tends to return the wedge bar to the position it should occupy when the door is open.

To prevent wear and provide adjustment I screw into the door jamb a screw I. By screwing this in or out the contact with the end of the bar F is brought about sooner or later as desired to increase or decrease the movement of the wedge bar F, and consequently the throw of the strip A.

The advantages of my device are obvious.

The device is exceedingly simple, and therefore correspondingly cheap. It possesses no parts liable to wear or derangement, and hence will be exceedingly durable.

When the door is opened the metal strip springs up close against the bottom of the door, and its presence is not noticeable; therefore the strip detracts in no way from the appearance of the door. When the door is closed the strip is pressed so closely against the threshold that an absolutely weather tight joint is formed. I find by experiment that the strip will make a tight joint even though the middle of the threshold be considerably worn down below the level. If it does not a metal reinforcing strip may be secured on top of the strip A whenever needed. This causes the strip to be sprung down more below the reinforcement than elsewhere, and makes the joint tight (see Figs. 4 and 5).

What I claim as my invention is:—

1. A door provided with a spring metal strip secured by one edge along the bottom of the door; and means engaging the strip adjacent to said edge and adapted to be operated by contact with the door jamb for springing down said metal strip into contact with the threshold of the door, substantially as described.

2. A door provided with a spring metal strip secured by one edge along the bottom of the door, which has a groove formed therein over the strip; and means located in said groove engaging the strip adjacent to said edge and adapted to be operated by contact with the door jamb for springing down said metal strip into contact with the threshold of the door, substantially as described.

3. A door provided with a spring metal strip secured by one edge along the bottom of the door, which has a half round groove formed therein over the strip; a half round bar located in said groove; and means adapted to be operated by contact with the door jamb for rocking the bar to spring down the said metal strip into contact with the threshold of the door, substantially as described.

4. A door provided with a spring metal strip secured by one edge along the bottom of the door; a half round groove in the bottom over the strip; a half round bar located in said groove; an arm secured to one end of the bar; and a wedge adapted to engage the door and the arm as the door is closed to rock the arm and spring down said metal strip into contact with the threshold of the door, substantially as described.

5. A door provided with a spring metal strip secured by one edge along the bottom of the door; a half round groove in the bottom over the strip; a half round bar located in said groove; an arm secured to one end of the bar; and a wedge slidable in a recess in the door and adapted to engage the arm and the door jamb as the door is closed to rock the arm and spring down said metal strip into contact with the threshold of the door, substantially as described.

6. A door provided with a spring metal strip secured by one edge along the bottom of the door; a half round groove in the bottom over the strip; a half round bar located in said groove; an arm secured to one end of the bar; a wedge slidable in a recess in the door and adapted to engage the arm; and an adjusting screw in the door jamb with which the end of the wedge engages as the door is closed thereby rocking the arm to spring down said metal strip into contact with the threshold of the door, substantially as described.

7. A door provided with a spring metal strip secured by one edge along the bottom of the door; a half round groove in the bottom over the strip; a half round bar located in said groove; an arm secured to one end of the bar; a wedge slidable in a recess in the door and adapted to engage the arm and the door jamb as the door is closed to rock the arm and spring down said metal strip into contact with the threshold of the door; and a spring tending to move the wedge from engagement with the arm, substantially as described.

Toronto, Ont., 15th December, 1906.

ROBERT F. GREEN.

Signed in the presence of—
J. EDW. MAYBEE,
F. W. MCKENDRICK.